United States Patent
Hirsch

(10) Patent No.: US 9,162,759 B2
(45) Date of Patent: Oct. 20, 2015

(54) TWIST MECHANISM FOR TWISTING A ROTOR BLADE FOR A ROTORCRAFT, AND A BLADE

(75) Inventor: Jean-Francois Hirsch, Aix en Provence (FR)

(73) Assignee: Airbus Helicopters, Marignane Cedex (FR)

( * ) Notice: Subject to any disclaimer, the term of this patent is extended or adjusted under 35 U.S.C. 154(b) by 752 days.

(21) Appl. No.: 13/478,426

(22) Filed: May 23, 2012

(65) Prior Publication Data

US 2012/0308384 A1    Dec. 6, 2012

(30) Foreign Application Priority Data

May 31, 2011   (FR) ...................................... 11 01677

(51) Int. Cl.
| | | |
|---|---|---|
| *B64C 27/54* | (2006.01) | |
| *B64C 27/00* | (2006.01) | |
| *B64C 27/72* | (2006.01) | |

(52) U.S. Cl.
CPC ............... *B64C 27/54* (2013.01); *B64C 27/001* (2013.01); *B64C 2027/7266* (2013.01); *Y02T 50/34* (2013.01)

(58) Field of Classification Search
CPC .... B64C 27/001; B64C 27/32; B64C 27/327; B64C 27/33; B64C 27/54; F01D 7/00
USPC ....... 416/51, 147, 131, 134 A, 139–141, 155, 416/153, 46, 50, 52, 60
See application file for complete search history.

(56) References Cited

U.S. PATENT DOCUMENTS

| | | | |
|---|---|---|---|
| 4,768,482 A * | 9/1988 | Cheng et al. ................... | 123/363 |
| 5,505,589 A * | 4/1996 | Bergey ........................... | 416/147 |
| 7,578,654 B2 * | 8/2009 | Lorin De La Grandmaison et al. ............................. | 416/23 |
| 7,857,598 B2 * | 12/2010 | McGeer et al. ............... | 416/240 |

(Continued)

FOREIGN PATENT DOCUMENTS

| | | |
|---|---|---|
| DE | 19859041 C1 | 3/2000 |
| EP | 0734947 A1 | 10/1996 |
| EP | 1083123 A1 | 3/2001 |

(Continued)

OTHER PUBLICATIONS

Search Report and Written Opinion; Application No. FR 1101677; dated Feb. 24, 2012.

(Continued)

*Primary Examiner* — Edward Look
*Assistant Examiner* — Juan G Flores
(74) *Attorney, Agent, or Firm* — Brooks Kushman P.C.

(57) ABSTRACT

A twist mechanism for twisting a rotary-wing blade (2). A twist member (8) is movable by an actuator (11) of the centrifugal force type, which twist member has at least one flyweight (14) for driving a rotary member (13) about a pivot axis (A). The flyweight (14) is radially movable on the rotary member (13) by movement means. The centrifugal force FC to which the flyweight (14) is subjected as a result of the blade (2) being caused to rotate induces drive torque CM for causing the rotary member (13) to pivot, thereby causing the twist member (8) to be moved. The twist member (8) is in engagement with the blade (2) at its free end and is connected to the rotary member (13) via remote mechanical transmission means (12).

19 Claims, 2 Drawing Sheets

(56) References Cited

U.S. PATENT DOCUMENTS

2007/0205332 A1  9/2007  Mercier Des Rochettes
2010/0288120 A1* 11/2010  Penning .......................... 92/68

FOREIGN PATENT DOCUMENTS

GB           627117 A    7/1949
JP          2001058600 A  3/2001

OTHER PUBLICATIONS

Korean Notice of the Reason for Rejection Dated Oct. 17, 2013, Korean Patent Application No. 2012-0055664, Applicant EUROCOPTER, 4 Pages.

* cited by examiner

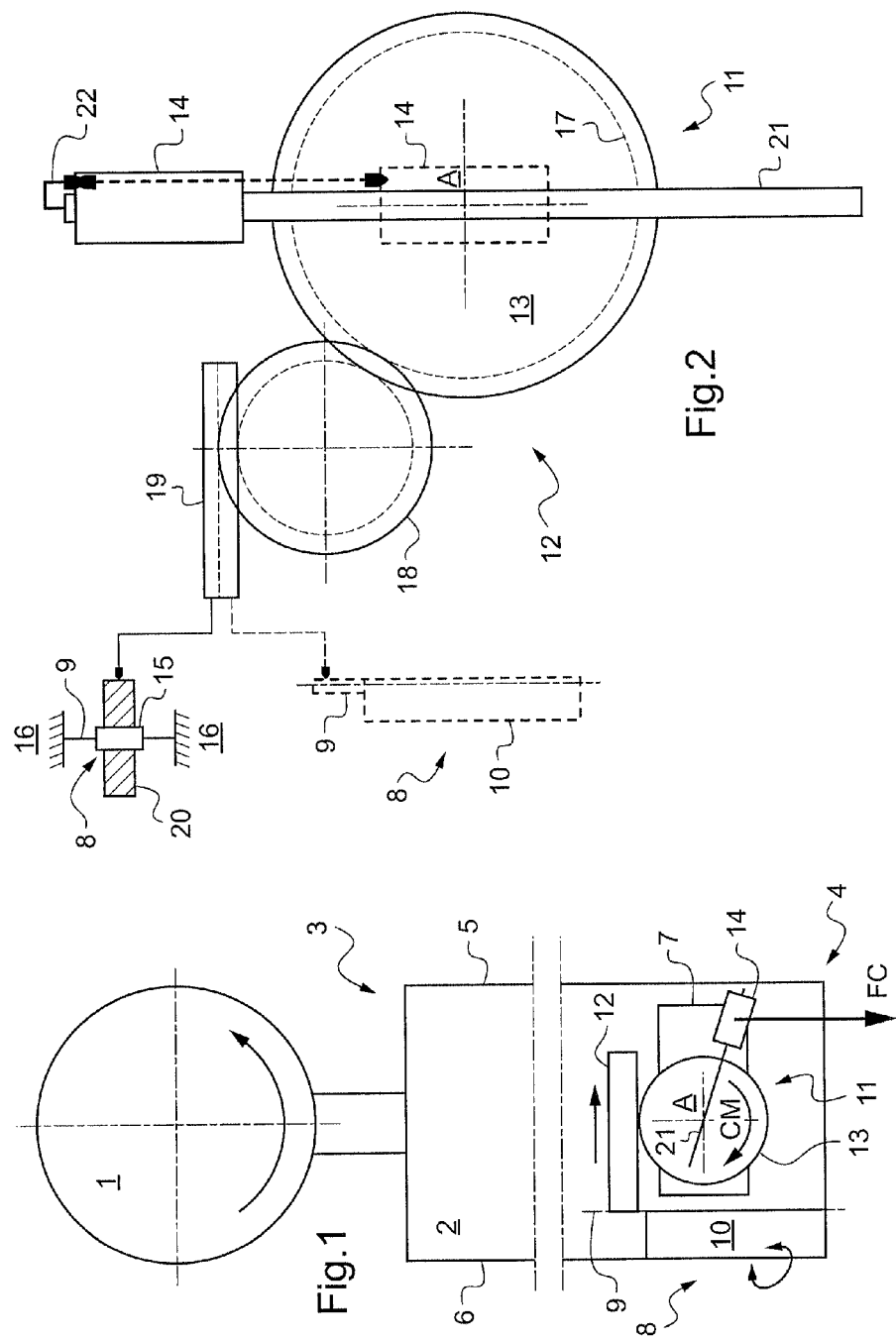

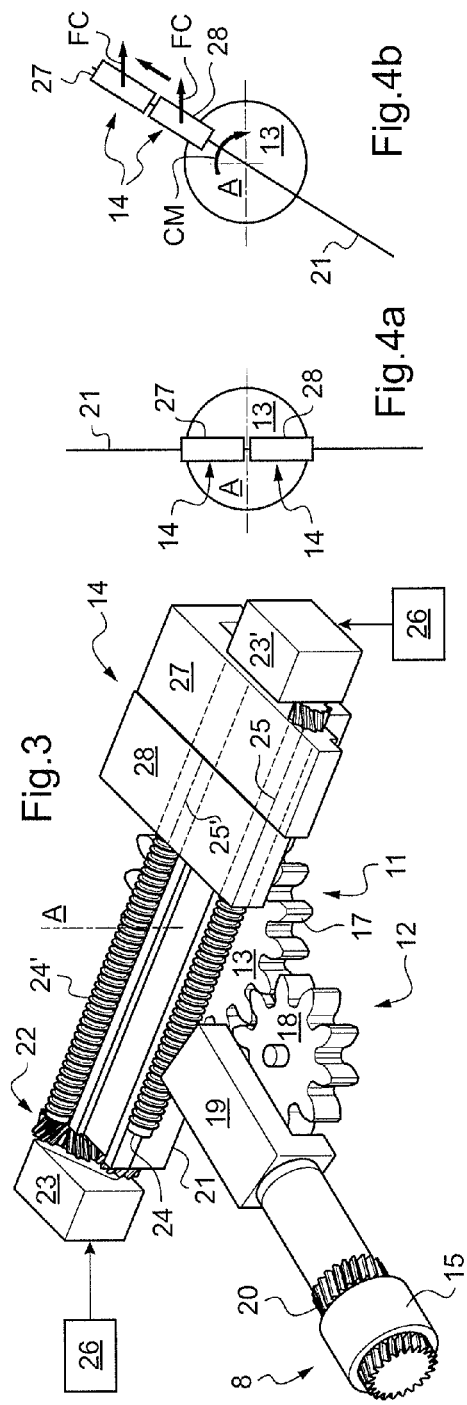

TWIST MECHANISM FOR TWISTING A ROTOR BLADE FOR A ROTORCRAFT, AND A BLADE

CROSS REFERENCE TO RELATED APPLICATIONS

This application claims priority to FR 11 01677 filed on May 31, 2011, the disclosure of which is incorporated in its entirety by reference herein.

BACKGROUND OF THE INVENTION (1) Field of the Invention

The present invention relates to the field of rotary-wing aircraft, such as rotorcraft equipped with at least one blade-carrying rotor, and it relates more specifically to mechanisms that equip such rotors in order to put the blades under stress by twisting them in their general plane of extension. The present invention relates to such a twist mechanism that is incorporable into a blade and that uses an actuator for actuating a twist member that is in engagement with the blade, in particular at the free end thereof. The present invention also relates to the associated blade.

(2) Background Art

Rotary-wing aircraft use a rotor to procure at least lift if not also propulsion. The rotary wing is made up of a plurality of blades that are distributed radially and that are carried individually by the hub of the rotor for being driven in rotation. A blade of the main rotor of a rotorcraft exerts lift when it is driven in rotation in order to procure lift for the rotorcraft. Flight controls are used to issue commands for changing the aerodynamic characteristics of the blades in order to act on the behavior of the rotorcraft as it is flying, by causing the angle of inclination of their surfaces of extension to vary relatively to the relative wind.

A blade is an airfoil that is highly elongate. A blade root end for anchoring the blade is assigned to engaging it with the hub of the rotor, its opposite end being considered to be a free end. The blade extends along its span over its surface of extension in a longitudinal dimension considered along a longitudinal axis between its anchor end and its free end, and in a transverse dimension considered between a leading edge and a trailing edge, which edges are opposite from each other. In the transverse dimension of the blade, which dimension is, in general, perpendicular to the longitudinal axis, there is defined a chord relative to which a camber line is formed and there are defined relationships of thickness on either side of said camber line so as to form, respectively, the suction-side surface and the pressure-side surface of each profile of the blade. Using various flight controls of the rotorcraft, the aerodynamic characteristics of the blades are modified by varying their pitch angle about the longitudinal axis that is referred to as the "pitch axis" and that extends in their longitudinal dimension. A cyclic flight control serves to modify the angle of incidence of the blades cyclically so as to influence the aerodynamic incidence of the blades and therefore so as to influence the progress of the rotorcraft, according to roll movements and pitching movements. A flight control modifying the collective pitch of the blades makes it possible to vary the altitude at which the rotorcraft is progressing.

The speed at which the rotorcraft progresses depends on the dissymmetry of the speeds between respectively an advancing blade that progresses from the rear towards the front of the rotorcraft, and a retreating blade that progresses in the opposite direction from the front towards the rear of the rotorcraft. The flow of air along the profile of the blades is determined by the shapes of their profiles, and varies depending on the situations in which the blades are placed during their rotation as advancing blade or as retreating blade. Such a variation in speed of air flow is commonly compensated by means of varying the angle of incidence of the blades, but it is observed that, as from a given angle of incidence, the retreating blade is placed in a stall situation. The speed of air flow over the retreating blade can be very low or indeed negative in a zone close to the hub of the rotor. Airstream separation is induced at the leading edge or at the trailing edge, resulting in a sudden drop in the lift procured by the blade if such separation propagates over a zone of longitudinal extension of the blade that is significant relative to its length. In addition, the airstream separation generates a vortex that is a source of vibrations and of an increase in the drag coefficient of the profile of the blade.

In order to avoid such a blade stall phenomenon, it is known that it is possible to twist the surface of extension of the blade in its longitudinal dimension. The twist of the blade may be permanent by being designed into it. However, it has become apparent that actively twisting the blade while the aircraft is in flight improves the performance of the rotary wing. The active twisting of the blades may be adapted according to rotary wing drive conditions and of the progress conditions of the rotorcraft.

Causing the blade to twist induces a progressive variation of incidence of profiles of the blade, between its free end and its anchor end, thereby making it possible to adapt each profile of the blade locally to suit the air flow speed between its leading edge and its trailing edge. In one general organization of a twist mechanism for twisting the blade, a twist member is put into engagement with the blade between its ends, and more particularly at its free end. Moving the twist member causes the blade to be put under torsion stress from one of its ends to the other end, thereby causing it to twist. In order to actuate the twist member, the rotor is equipped with means for moving the twist member, which means include a power source for powering an actuator of the twist member. Control means regulate activation of the actuator, in particular according to flight parameters, by being used in compliance with predefined flight commands and/or selectively by the pilot by means of manual control members.

For example, in Document U.S. Pat. No. 5,505,589 (BERGEY KARL H), the twist member is arranged as a ballast that is carried by the blade at its leading edge. The ballast is mounted to move in translation along the blade between the ends thereof, the ballast being moved by the actuator thereby locally generating torsion stress on the blade, thereby causing it to twist. The magnitude of the twisting of the blade varies depending on the position of the ballast between its ends, which ballast is moved by the actuator according to the flight conditions and/or of flight procedures. The actuator is an electrically driven member that is connected to the ballast via a mechanical transmission mechanism, such as of the type having a wheel and a worm screw. The actuator and the transmission mechanism are housed inside the blade, the actuator being electrically powered from the on-board power supply network of the rotorcraft.

Other ways of actively twisting the blade are known, such as using a shape-deforming element that is in engagement with and/or that is incorporated in the skin of the blade that forms its outside wall and that defines its suction-side and pressure-side surfaces. For example, the actuator may be of the piezoelectric type for urging the element to deform, and it may be powered from the on-board network of the rotorcraft. The magnitude of the twisting of the blade varies depending on the stress applied to urge the element to deform, while being caused by the piezoelectric means being activated by the control means according to the flight conditions and/or of the flight procedures. For example, reference can be made to Document US 2007/205332 (ONERA) that describes a blade twist mechanism of that type.

It is also known that it is possible to mount a flap hinged to the free end of a blade, and to move it so as to tilt it in flight using control means that are activated by the pilot. For example, in EP 0 734 947 (INST ADV TECH HELICOPTER LTD), such a flap is used to procure incidence for a blade. The flap is movable by an actuator that is housed inside the blade and that is in communication with the flap via a transmission mechanism having hinged links. The actuator is an electric motor member that is powered from an on-board network of the rotorcraft.

A problem that arises lies in the ways of mounting, inside a blade, an active twist mechanism of the type suitable for putting the blade under torsion stress according to flight commands issued by the pilot. Account needs to be taken of the facts that the space available inside the blade is small and that incorporating the twist mechanism for twisting the blade should not give rise to imbalance or disturb the behavior of the blade when it is driven in rotation. In addition, the twist mechanism must be compact but nevertheless robust and reliable, and incorporating it into the internal volume of the blade must be made safe in view of the hostile environment in which it is placed. The twist mechanism is subjected to large amounts of vibration and of mechanical stress due to the rotary wing rotating, and the way it is mounted inside the blade must be adapted accordingly.

The actuators used to twist the blades are piezoelectric or electromechanical power members, use of which involves grouping together structural means that are complex and costly. Such structural means must procure reliable and safe operation of the actuators with regard to the electrical nature of their energy source and to the hostile environment in which they are mounted. The actuators are movement-producing means having developed power that must be adapted to suit moving the twist members, while being sufficient to deform the surface of extension of the blade, and finally the blade as a whole. The structure of the actuators is complex, it being made up of numerous heavy and/or voluminous members, such as coils, magnets, and pins. The electrical power supply for powering the actuators from the on-board network of the rotorcraft must be safe and reliable, and must deliver power adapted to use of the actuators. The electrical power is brought from the on-board network to the free end of the blade by means of voluminous cables of large section that extend inside the blade. Passing the cables between the axis of rotation of the rotor and the internal space in the blades involves installing rotary electrical connections that offer good performance and that are safe, which connections are costly. An actuator of the piezoelectric type is less demanding in terms of power to be delivered, but it involves using high-voltages which must be conveyed safely. The hostile environment of a moving blade is not favorable to the use of power cables carrying high voltages, and is a source of major difficulties and of considerable costs for organizing, making safe, and maintaining an electricity network that is suitable for powering the actuator and that is received inside the blade.

In a technique remote from twisting the blades of a rotary wing, it is also known that it is possible to use a flyweight to move flaps placed at the end of a blade. For example, Document GB 627 117 describes a device for managing a flow rate of air expelled at the end of a blade equipping a rotary wing of a rotorcraft. That device has nozzles that are equipped with closure flaps for regulating the flow rate of air that they expel. Those flaps are movable by a lever arm that is mounted to pivot at the end of the blade, and that carries a counterweight causing the lever arm to pivot in opposition to a return spring.

Documents DE 198 59 041 and EP 1 083 123 are also known.

BRIEF SUMMARY OF THE INVENTION

An object of the present invention is to propose a twist mechanism for twisting a blade of a rotary wing equipping a rotor for rotorcraft. The twist mechanism should be reliable and safe in spite of the hostile environment to which it is subjected due to it being housed inside the blade. The twist mechanism should also be of simple structure and be suitable for being mounted in the blade while avoiding requiring complex and costly arrangements in order for it to be used.

The mechanism of the present invention is a twist mechanism for twisting a rotary-wing blade over its surface of extension. Such a rotary wing equips, in particular, a rotor for a rotorcraft, and it has a plurality of blades that are driven in rotation by a hub of the rotor that is in engagement with a rotor shaft. The twist mechanism has a mounting structure for mounting it in the blade, a twist member that is provided with engagement means for engaging the blade, and a drive assembly for moving the twist member. The twist mechanism forms an assembly that is suitable for incorporating in the blade via the mounting structure, while being, in particular, received in the internal volume of the blade that is defined between its suction-side surface and its pressure-side surface. The twist member, or indeed and preferably also the twist mechanism as a whole is more particularly integratable via the mounting structure at the free end of the blade, so as to optimize the stresses that it applies to cause the blade to twist. The twist member is suitable for applying torsion stress to the blade so as to cause it to twist angularly. The drive assembly comprises an actuator constituting drive means that produce a movement used for moving the twist member, and transmission means for transmitting the movement generated by the actuator to the twist member for moving it.

The mechanism of the present invention is mainly recognizable in that the actuator is of the centrifugal force type, and it has at least one flyweight for driving a rotary member carrying the flyweight about a pivot axis. The flyweight is more particularly placed on the rotary member at some radial distance from its pivot axis, so as to move the rotary member in rotation under the effect of drive torque that is generated by the flyweight as subjected to a centrifugal force.

The centrifugal force, to which the flyweight is subjected, is generated by the drive in rotation of the rotary wing, and more particularly by the blade carrying the mechanism being caused to move in rotation about the axis of rotation of the rotor. The actuator constitutes drive means moved by the flyweight that generates drive torque for driving the rotary member about the pivot axis. This drive torque is generated by the energy coming from the rotary wing being driven in rotation by the rotor. The energy for driving the rotary member about the pivot axis is procured by the flyweight, by being induced by the flyweight being caused to move in rotation about the axis of rotation of the rotor. The flyweight that is carried by the rotary member that is itself mounted on the blade via the mounting structure is subjected to a centrifugal force induced by the rotary wing being moved in rotation. Since the flyweight is disposed at some radial distance from the pivot axis of the rotary member, the centrifugal force to which the flyweight is subjected generates drive torque on the rotary member, thereby causing it to pivot about the pivot axis, and therefore causing the twist member to move via the transmission means. The angular position of the rotary member relative to the pivot axis is dependent on the ratio between the drive torque generated by the flyweight and the resisting torque induced by the resistance of the blade to being twisted. The rotary member is a member that is substantially plane, such as a disk-shaped member or a member that is of some analogous shape, and that is carried by the mounting structure so that its plane is disposed along the surface of extension of the blade. In the situation in which the twist mechanism is mounted in the blade, the pivot axis extends perpendicularly to the overall plane of extension of the blade.

Since the drive torque is generated from the centrifugal force to which the blade as driven in rotation by the hub is subjected, the actuator does not need specific power supply coming from the rotorcraft's own resources, and in particular it does not need an electrical power supply conveyed via a wire link connected to the on-board network of the rotorcraft. The actuator is structurally simple and compact, reliable, inexpensive, and accurate. The drive torque can be varied readily and accurately by means of adjusting the radial position of the flyweight on the rotary member. This adjustment advantageously varies continuously according to the immediate needs for moving the twist member depending on the flight conditions of the rotorcraft, and more particularly depending on the ways the rotary wing is being driven and on the desired lift procured by the blade. The flyweight can thus readily be moved radially in translation on the rotary member by a drive member of low power, without giving a complex structure to the actuator, or requiring costly arrangements specific to powering and to controlling use of such a low-power drive member assigned to moving the flyweight.

The actuator is suitable for producing a rotary movement that is readily transmittable to the twist member by suitable transmission means. The capacities of the actuator used for moving the twist member are limited to what is necessary, pivoting of the rotary member being sufficient to move the twist member, which may itself be formed by a tiltable flap or by a torsion arm in engagement with the blade. The mechanism, the means for moving it and the ways it can be incorporated into the blade are structurally simple and inexpensive, and the risks of the actuator failing are minimized.

The rotary member is provided with mounting means for mounting the rotary member inside the blade to pivot about the pivot axis, which mounting means are integrated into the mounting structure for mounting the whole mechanism into the blade. The rotary member is carried by the mounting structure about a pivot axis that extends transversely, in particular perpendicularly, to the surface of extension of the blade in the installation position of the mounting structure in the blade. More particularly, the rotary member carries the flyweight via means for radially positioning the flyweight off-center relative to the pivot axis of the rotary member.

The radial position of the flyweight is adapted continuously depending on the needs for stressing the blade in torsion in order to cause it to twist, in particular according to the flight commands of the rotorcraft, and more particularly according to the ways in which the rotary wing is driven and the needs of the lift to be procured by the blade. The blade is twisted by means of the flyweight being caused to move in translation, obviating the need to have the twist member moved directly by a power member powered from a source external to the blade. The radial position of the flyweight can be readily adapted by movement means for causing the flyweight to move on the rotary member along a radial path for movement in translation centered on the pivot axis. Use of the movement means is advantageously controlled according to the conditions for causing the rotary wing to move in rotation and/or according to the flight commands that are issued.

More particularly, the flyweight is advantageously mounted to move radially in translation on the rotary member, between a neutral equilibrium position and an active drive position for pivoting the rotary member. In the neutral position, the flyweight is centered on the pivot axis so that the effect of the centrifugal force on the flyweight does not generate any drive torque on the rotary member. For example, the flyweight may be centered by putting the flyweight in position relative to the pivot axis so that its center of gravity is placed on the pivot axis. In the active position, the flyweight is placed at some radial distance from the pivot axis and generates drive torque on the rotary member under the effect of the centrifugal force. In the active position, the flyweight is off-center relative to the pivot axis, its center of gravity being placed at some radial distance from the pivot axis.

In one embodiment, a plurality of flyweights are provided and/or, by analogy, the flyweight is made up of a plurality of elementary flyweights, which flyweights or elementary flyweights are movable independently from one another. In the neutral position, the flyweights or elementary flyweights are placed radially equidistant from the pivot axis on either side thereof. In the active position, the flyweights or elementary flyweights are suitable for being moved independently so as to adjust the developed drive torque and/or so as to modify the direction of pivoting of the rotary member. The respective movements of the flyweights or elementary flyweights are suitable for causing them to be moved to respective radial distances from the pivot axis, while being placed either on the same side or on either side of said pivot axis while they are being moved.

In particular, the flyweight is equipped with movement means for moving it in radial translation on the rotary member, use of the movement means being placed under the control of control means for causing the blade to twist according to the needs for lift procured by its profile and/or according to the ways the rotary wing is driven in rotation. The control means are suitable for being placed under the control of means for evaluating a change of speed of the rotor and/or are suitable for being used during specific stages of driving of the rotary wing, in order to reduce the induced noise pollution.

In particular, the movement means for moving the flyweight comprise at least one drive member for moving the flyweight along a guide. Such a drive member is a member having low developed power and procuring movement in translation of the flyweight on the rotary member. The power of the drive member is advantageously limited to power just sufficient to move the flyweight in translation in opposition only to its own weight and to friction forces induced by it moving along the guide. In particular, such a drive member is chosen to be an electric motor that is powered from the on-board network of the rotorcraft. Since the drive member is a low-power member, the constraints necessary for making its wire-network power supply safe are low, thereby making it easier to incorporate such a wire network into the blade. The electrical power necessary for powering the drive member is suitable for being low-voltage and low-current, while being conveyed from the anchor end of the blade to the drive member via a wire link of small diameter. It is easy to install the wire link safely inside the blade, and such installation procures wire-link reliability and endurance of good performance but at lower cost.

The drive member is preferably a rotary electric motor, but it may also be some other type, e.g. according to the needs in terms of mobility and mass of the flyweight, according to the type of rotary wing and/or according to the span of the blade.

Since the energy needs of the drive member are low, the arrangement and the type of the drive member may be chosen freely according to the needs, without requiring complex and costly arrangements of the mechanism and/or of the ways in which it is incorporated into the blade. By way of non-limiting example taken in isolation or in combination, the drive member may also be a member having electromechanical, pneumatic, hydraulic, or magnetic motor-drive, or indeed use shape-changing elements of the dielectric or magnetic type, piezoelectric elements, or indeed fibers or bodies that are deformable when they are stressed.

The drive member is compact and light in weight, and may be indifferently carried by the rotary member or by the flyweight or indeed by the guide. The power supply wire link for powering the drive member from the on-board network of the rotorcraft extends easily from the anchor end of the blade to the drive motor, e.g. by passing along the pivot axis of the rotary member via a trunnion mounting.

In one embodiment the drive member is a rotary motor in engagement with the flyweight via a mechanism having a screw and a nut and/or co-operating wheel. The screw is provided at least in part along the guide, and the flyweight is advantageously provided with the nut and/or the wheel. Such ways of co-operation between the drive member and the flyweight are structurally simple and light in weight.

The rotary member is advantageously arranged as a wheel provided with engagement means for engaging with the transmission means so as to drive them. In particular, such an engagement member is formed by a set of teeth suitable for co-operating with a complementary set of teeth mounted on a transmission member, in particular on a pinion and/or on a rack, with which the transmission means are provided.

The transmission means are arranged according to the needs and of the available volume of the blade that is reserved for installing them. Depending on the configuration of the blade, the transmission means comprise at least one of the following: a bell-crank mechanism and/or a force-amplification mechanism and/or a mechanism having means for modifying movement amplitude, and/or a mechanism converting between movement in rotation and movement in translation.

In one embodiment, the transmission means comprise a rack mechanism or an analogous member suitable for converting the pivoting movement generated by the actuator into a movement in translation. Such a remote mechanical transmission mechanism makes it possible to place the actuator at some distance from the twist member. For example, the rack mechanism includes a pinion that is in engagement jointly with the rotary member and with a rack for remotely moving the twist member, directly or via a remote transmission mechanism, and/or via a movement conversion mechanism.

Depending on the ways in which the twist member is moved, the transmission means are suitable for being equipped with means for converting the movement in translation of the rack into movement in rotation for driving the twist member. For example, the transmission means may comprise a transmission mechanism having a helical guide ramp and that is interposed between the rack and the twist member.

In a particular embodiment, the flyweight is made up of two elementary flyweights that are mounted to move in radial translation on the rotary member independently of each other. Such an arrangement of the flyweight makes it possible to procure continuously finer adjustment of the rotary member angular position relative to the pivot axis and/or to change the direction of pivoting of the rotary member. For example, the elementary flyweights are moved by elementary drive members with which the movement means are provided, and that are assigned to respective ones of said elementary flyweights, or else they are moved by a common drive member via respective linkages that are assigned to them and that are suitable for being moved in isolation or jointly. The elementary flyweights are preferably moved along a common guide, either in the same direction along the common guide or in opposite directions.

The twist member may be of any type, while being formed of a member that is structurally suitable for being put into engagement jointly with the blade and with the actuator, in particular via transmission means, so as to impart torsion to the blade over its surface of extension, and therefore so as to cause said blade to twist. It should be noted that the mechanism of the invention that is described above is suitable, by analogy, for being applied to other functions analogous to the function of moving the twist member, in particular when the twist member is arranged as a flap for modifying the corresponding profiles of the blade.

In an example of an arrangement of the twist member, said twist member is a flap that is provided with hinge means for hinging to a blade edge, such as a flap that is tiltably mounted on the trailing edge of the blade. Such hinge means in engagement with the flap and with the blade form the engagement means.

In an example of an arrangement of the twist member, said twist member is a torsion arm provided with anchor means for anchoring to a wall of the blade. Such a torsion arm may be shaped as an elongate element, such as a tiltable lever and/or a bell-crank lever, or indeed may be shaped as a circularly symmetrical element co-operating by movement in rotation via the transmission means, and more particularly via the helical-guide ramp transmission means associated with the rack mechanism. The anchor means form the engagement means for engaging the twist member with the blade.

The movement of the flyweights inside the blade as driven in rotation induces a modification in the balance of the inertial forces that are present and therefore induces a modification in the dynamic behavior of the blade. In order to avoid such modifications, the twist mechanism preferably has a compensation device for compensating the effects of the movement of the flyweights on the dynamic behavior of the blade. In one embodiment of the compensation mechanism, it has at least one compensation flyweight that is mounted to move on the blade along a movement axis corresponding to the chord of the blade, for example. The compensation flyweight is in rupture of engagement with the rotary member on which it is inoperative, its mass and its mobility on the blade being organized to compensate for the effects induced by the movement of the flyweights assigned to driving the rotary member, with regard to the dynamic behavior of the blade per se.

In addition to providing a twist mechanism, the invention also provides a blade provided with such a mechanism.

BRIEF DESCRIPTION OF THE SEVERAL VIEWS OF THE DRAWINGS

Embodiments of the present invention are described below with reference to the figures of the accompanying drawings, in which:

FIG. 1 is a diagrammatic view of a rotary wing blade that is equipped with a twist mechanism in a general embodiment of the present invention;

FIG. 2 is a detailed diagrammatic view of a twist mechanism for twisting a rotary wing blade in a particular embodiment of the present invention;

FIG. 3 is a diagrammatic perspective view of a twist mechanism for twisting a rotary wing blade in another particular embodiment of the present invention;

FIG. 4 is made up of diagrams "a" and "b" that show a succession of ways of using a twist mechanism of the present invention including a pair of flyweights; and FIG. 5 is made up of diagrams "c", "d", "e" and "f" that show a succession of other ways of using a twist mechanism of the present invention including a pair of flyweights.

DETAILED DESCRIPTION OF THE INVENTION

In FIG. 1, a rotor for a rotorcraft has a rotary wing that is driven in rotation from a hub 1 driven by a shaft. This rotary wing is made up of a plurality of blades, such as the blade 2 shown diagrammatically in the figure. The blade 2 is a highly elongate airfoil that extends longitudinally along a span between an anchor end 3 engaged with the hub 1 and a free end 4 that is opposite from the anchor end 3. Transversely, the blade 2 extends between a leading edge 5 and a trailing edge 6 along a chord. The outside wall of the blade 2 is a skin forming its suction-side surface and its pressure-side surface.

Under certain flight conditions, it is advantageous actively to cause the surface of extension of the blade 2 to twist along its longitudinal dimension. With the blade 2 being held on the hub 1 at its anchor end 3, torsion stress is applied to the blade 2 between its ends, and in particular in the immediate vicinity of the end of its free end 4. Stressing the blade 2 causes it to twist along its longitudinal dimension so as to modify the angular position of its airfoil profiles progressively from one of its ends to the other end. To this end, the blade 2 incorporates a twist mechanism that is installed in its internal volume defined between its suction-side surface and its pressure-side surface.

The twist mechanism has a mounting structure 7 for mounting it in the blade 2, and it implements a twist member 8 that is provided with engagement means 9 for engaging the free end 4 of the blade 2. In the embodiment shown in the figure, the twist member 8 is formed by a tiltable flap 10 that is hinged at the end of the blade 2, to the free end 4 thereof and on the trailing edge 6 thereof. The hinge that hinges the flap 10 to the blade 2 forms the engagement means 9, via which the blade 2 is stressed as a result of the flap 10 being caused to tilt. The twist means 8 are moved by a drive assembly comprising an actuator 11 that constitutes drive means producing movement, and that is put into remote mechanical communication with the twist member 8 via transmission means 12, so as to transfer the movement produced by the actuator 11 to the twist member 8.

The actuator 11 mainly associates a rotary member 13 and a flyweight 14 that is carried by the rotary member 13 via a guide 21. The rotary member 13 is mounted to pivot on the mounting structure 7 about a pivot axis A extending perpendicularly to its surface of extension, and the flyweight 14 is adapted to be placed at some radial distance from said pivot axis A as shown.

When the rotary wing is driven in rotation by the rotor, the blade 2 is subjected to a centrifugal force FC and each of the components carried by the blade 2 is subjected to said centrifugal force FC proportionally to its mass. The flyweight 14 is therefore subjected to such a centrifugal force FC that induces drive torque CM centered on the pivot axis A. The amplitude of said drive torque CM is proportional to the centrifugal force FC to which the flyweight 14 is subjected, and depends on the rotational speed of the blade 2, on the mass of the flyweight 14, and on the distance of radial separation between the flyweight 14 and the pivot axis A. This drive torque CM causes the rotary member 13 to pivot about the pivot axis A, this pivoting being used to move the twist member 13 via the transmission means 12.

In FIG. 2, a drive assembly is organized to move a twist member 8 for twisting a blade 2, using the type of centrifugal force mechanism that is shown in FIG. 1. The drive assembly comprises the rotary member 13 that carries a flyweight 14 and that is in remote mechanical communication with the twist member 8 via transmission means 12. The transmission means 12 comprise movement conversion mechanisms that are successively in engagement with one another, from the rotary member 13 to the twist member 8.

In a variant shown in continuous lines, the twist member 8 is arranged as a torsion arm 15 provided at at least one of its ends with engagement means 9 that are arranged as anchor means for anchoring the torsion arm 15 to a wall 16 of the blade 2, and in particular to the skin forming the outside wall of the blade 2. The torsion arm 15 is an element shaped as a cylinder that is driven in rotation from the transmission means 12. In a variant shown in dashed lines, the twist member 8 is arranged as a tiltable flap 10 as in the embodiment shown in FIG. 1, the hinge of which flap constitutes the engagement means 9 for engaging the twist member with the blade 2.

In FIG. 2 and in FIG. 3, the rotary member 13 is arranged as a wheel provided with an engagement member 17 for engaging with the transmission means 12, such as formed by a set of teeth or the like co-operating with a pinion 18 of the transmission means 12. This pinion 18 co-operates with a rack 19 for transforming the rotary movement of the pinion 18 into movement in translation. Such movement in translation is suitable for being used to move the twist member 8, in particular arranged as a tiltable flap 10 as shown in dashed lines. The rack 19 is advantageously disposed on the blade 2 while extending along the chord defining its profile. In one embodiment, the rack 19 may, for example, be guided in translation along a tube mounted on the load-bearing structure, while being in engagement with a shaft provided with a helical guide ramp 20. The shaft having the helical guide ramp 20 forms a remote mechanical transmission member, and makes it possible to convert the movement in translation of the rack 19 into a movement in rotation. This movement in rotation is imparted to a co-operating cylinder forming the torsion arm 15, which bears against the wall of the blade 2 so as to impart torsion stress to the blade 2 whenever the cylinder is moved in rotation.

The flyweight 14 is carried by the rotary member via a guide 21 that extends radially to the rotary member 13 while being centered on the pivot axis A. Movement means 22 are used to move the flyweight 14 along the guide 21 between a neutral equilibrium position and an active drive position for pivoting the rotary member 13. In the neutral position, the guide extends along the chord of the blade that extends between its leading edge and its trailing edge. In FIG. 2, the flyweight 14 is shown in the neutral position in dashed lines and in the active position in continuous lines. In the neutral position, the flyweight 14 is centered on the pivot axis A and does not impart any drive torque to the rotary member 13. In the active position, the flyweight 14 is radially spaced apart from the pivot axis A and generates drive torque CM that causes the rotary member 13 to pivot.

In FIG. 3, the flyweight 14 is subdivided into two elementary flyweights 27, 28 moveable by the movement means 22 along a common guide 21. The movement means 22 comprise two drive members 23, 23' that are assigned to moving a respective elementary flyweight 27, 28. The drive members are carried at respective ends of the guide 21, and they cooperate with a transmission mechanism of the type having screws 24, 24' and nuts 25, 25' that are assigned to them. The drive members 23, 23' are low-power electrical rotary drive members that are powered from the on-board network of the rotorcraft and use of which is placed under the control of control means 26. The drive members 23, 23' are in engagement with respective screws 24, 24' that co-operate with nuts 25, 25' provided through the corresponding elementary flyweight 27, 28 so as to cause it to be moved in radial translation.

In FIGS. 3 and 4, the flyweight 14 is subdivided into two elementary flyweights 27, 28 of the same mass that are carried jointly by a common guide 21 with which the rotary member 13 is equipped. Subdividing the flyweight 14 into a plurality of elementary flyweights 27, 28 makes it possible to optimize the induced drive torque CM on the basis of using the overall mass of the flyweight 14, or conversely to restrict it on the basis of a combined and adapted movement of one and/or the other of the elementary flyweights 27, 28, and/or indeed to reverse the direction of rotation of the rotary member 13. Movement of one and/or the other of the elementary flyweights 27, 28 makes it possible to cause the ways in which the blade is twisted to vary continuously and immediately according to needs.

In FIG. 4, the elementary flyweights 27, 28 are placed along the guide 21 in different positions, respectively shown in diagrams "a" and "b". In diagram "a", the elementary flyweights 27, 28 are placed equidistantly from the pivot axis A of the rotary member 13, when the flyweight 14 is in the neutral position. In diagram "b", the elementary flyweights 27, 28 are moved jointly in the same direction along the guide when the flyweight 14 is in the active position, while generating optimized drive torque CM.

In FIG. 5, the elementary flyweights 27, 28 are placed along the guide 21 in different positions, respectively shown in diagrams "c" to "f". In diagram "c", the elementary flyweights 27, 28 are placed equidistantly from the pivot axis A of the rotary member 13, in a neutral position of the flyweight 14. In diagram "d", a first elementary flyweight 27 is moved in a first direction along the guide 21, so as to generate the torque CM used for driving the rotary member 13. Since the second elementary flyweight 28 is held in the initial position, the torque CM that it develops, which torque opposes the torque developed by the first elementary flyweight 27, is negligible due to it being held in the vicinity of the pivot axis A. In diagram "e", the elementary flyweights 27, 28 are moved jointly along the guide 21 in a second direction opposite from the first direction. The drive torque CM decreases progressively until it becomes zero when the elementary flyweights 27, 28 are in the neutral position, as shown. In diagram "f", the joint movement of the elementary flyweights 27, 28 in a second direction is maintained. The drive torque CM generated by the second elementary flyweight 28 that is moved away from the pivot axis A while the first elementary flyweight 27 is being moved towards said axis, causes the direction of rotation of the rotary member 13 to be reversed.

Sequential movement a flyweight 14 or of elementary flyweights 27, 28 along the guide 21 on either side of the pivot axis A makes it possible to obtain continuous variation in the twist of the blade according to the ways in which the rotary wing is driven in rotation and according to the instantaneous radial position of the blade relative to the general orientation of the rotorcraft. Regulating the individual and/or joint stroke(s) of the elementary flyweights along the guide makes it possible to regulate continuously the instantaneous amplitude of twisting of the blade.

What is claimed is:

1. A twist mechanism disposed within a rotary-wing blade for twisting a rotary-wing blade, the twist mechanism comprising a twist member provided with engagement means for engaging the blade, and a drive assembly for moving the twist member, the drive assembly comprising an actuator and transmission means for transmitting the movement generated by the actuator to the twist member for moving it, wherein the actuator is of the centrifugal force type, and it has at least one flyweight for driving a rotary member carrying the flyweight about a pivot axis (A), the rotary member being arranged as a wheel provided with engagement means for engaging with the transmission means so as to drive them.

2. A mechanism according to claim 1, wherein the rotary member is provided with mounting means for mounting it in the blade to pivot about a pivot axis (A) extending transversely to a surface of extension of the blade.

3. A mechanism according to claim 1, wherein the rotary member carries the flyweight via means for radially positioning the flyweight off-center relative to the pivot axis (A) of the rotary member.

4. A mechanism according to claim 1, wherein the flyweight is mounted to move radially in translation on the rotary member, between a neutral equilibrium position centered on the pivot axis (A) and an active drive position for pivoting the rotary member, in which position the flyweight is off-center relative to the pivot axis (A).

5. A mechanism according to claim 1, wherein the flyweight is equipped with movement means for moving it in radial translation on the rotary member, use of the movement means being placed under the control of control means.

6. A mechanism according to claim 5, wherein the movement means for moving the flyweight comprise at least one drive member for moving the flyweight along a guide.

7. A mechanism according to claim 6, wherein the drive member is carried by the rotary member or by the flyweight or by the guide.

8. A mechanism according to claim 6, wherein the drive member is a rotary motor in engagement with the flyweight via a mechanism having a screw and a nut, the screw being provided at least in part along the guide and the flyweight being provided with the nut.

9. A mechanism according to claim 1, wherein the transmission means comprise at least one of the following: a bell-crank mechanism and/or a force-amplification mechanism and/or a mechanism having means for modifying movement amplitude, and/or a mechanism converting between movement in rotation and movement in translation.

10. A mechanism according to claim 1, wherein the transmission means comprise a rack mechanism, having a pinion that is in engagement jointly with the rotary member and with a rack for moving the twist member.

11. A mechanism according to claim 10, wherein the transmission means comprises a transmission mechanism having a helical guide ramp and interposed between the rack and the twist member.

12. A mechanism according to claim 1, wherein the flyweight is made up of two elementary flyweights that are mounted to move in radial translation on the rotary member independently of each other.

13. A mechanism according to claim 1, wherein the twist member is a flap provided with hinge means for hinging to a blade edge, which hinge means form the engagement means.

14. A mechanism according to claim 1, wherein the twist member is arranged as a torsion arm provided with anchor means for anchoring to at least one wall of the blade, which anchor means form the engagement means.

15. An aircraft blade, including a mechanism according to claim 1.

16. A blade according to claim 15, wherein the blade is configured to rotate about an axis of rotation during flight and the pivot axis is generally parallel to the axis of rotation.

17. A twist mechanism disposed within a rotary-wing blade for twisting a rotary-wing blade, the twist mechanism comprising:
- a twist member having engagement means for engaging the blade; and
- a drive assembly configured to move the twist member, the drive assembly including an actuator and transmission means for transmitting movement generated by the actuator to the twist member for moving it, the actuator being a centrifugal actuator including at least one flyweight for driving a wheel carrying the flyweight about a pivot axis (A), the wheel having engagement means for drivingly engaging with the transmission means.

18. A rotor assembly for a helicopter, the assembly comprising:
- a hub configured to rotate about an axis of rotation;
- a rotor blade coupled to the hub;
- a twist member coupled to the rotor blade and movable between a first position and a second position, the first position imparting a first twist profile to the rotor blade and the second position imparting a second twist profile to the rotor blade, the first twist profile being different from the second twist profile; and
- a rotary member disposed within the rotor blade, the rotary member carrying a flyweight about a pivot axis and being configured to drive the twist member in response to pivoting motion about the pivot axis, the pivot axis being generally parallel to the axis of rotation.

19. The rotor assembly of claim 18, further comprising a rack drivingly coupling the rotary member and the twist member, wherein the rotary member includes a wheel engaged with the rack.

\* \* \* \* \*